(12) United States Patent
Marker

(10) Patent No.: US 12,098,735 B2
(45) Date of Patent: Sep. 24, 2024

(54) PYROTECHNIC ACTUATOR

(71) Applicant: ASTOTEC AUTOMOTIVE GMBH, Hirtenberg (AT)

(72) Inventor: Markus Marker, Grillenberg (AT)

(73) Assignee: ASTOTEC AUTOMOTIVE GMBH, Hirtenberg (AT)

( * ) Notice: Subject to any disclaimer, the term of this patent is extended or adjusted under 35 U.S.C. 154(b) by 0 days.

(21) Appl. No.: 17/789,667

(22) PCT Filed: Mar. 24, 2021

(86) PCT No.: PCT/AT2021/060096
§ 371 (c)(1),
(2) Date: Jun. 28, 2022

(87) PCT Pub. No.: WO2021/189089
PCT Pub. Date: Sep. 30, 2021

(65) Prior Publication Data
US 2023/0070630 A1    Mar. 9, 2023

(30) Foreign Application Priority Data
Mar. 24, 2020   (AT) .............................. A 50245/2020

(51) Int. Cl.
*F15B 15/19*   (2006.01)
(52) U.S. Cl.
CPC .................................. *F15B 15/19* (2013.01)

(58) Field of Classification Search
CPC ....................................................... F15B 15/19
USPC ........................................................ 89/1.14
See application file for complete search history.

(56) References Cited

U.S. PATENT DOCUMENTS 4,412,420 A    11/1983   Patrichi
2007/0240417 A1   10/2007   Hirooka

FOREIGN PATENT DOCUMENTS

| AT | 11267 A | 7/2010 |
|----|---------|--------|
| DE | 102010039821 A | 3/2012 |
| DE | 102011086823 A | 6/2012 |
| JP | 07205793 A | 8/1995 |

*Primary Examiner* — Samir Abdosh
(74) *Attorney, Agent, or Firm* — Andrew Wilford

(57) ABSTRACT

An actuator has a housing (14), a pyrotechnic charge (17) and a piston (11) which transitions into a pin (12) which in the initial state projects out of the housing (14) and upon ignition of the pyrotechnic charge (17) is retracted at least partially into the housing (14). According to the invention, the piston-pin combination consists of a main body (10) which is made of plastic and has a reinforcing element (13) in the region of the pin (12). The reinforcing element (13) has the shape of a sleeve or tube and surrounds the pin (12). It is form-fittingly connected to the pin (12), for example by the sleeve-like or tubular reinforcing element (13) having a shape (22) for reducing the inner cross-section.

11 Claims, 1 Drawing Sheet

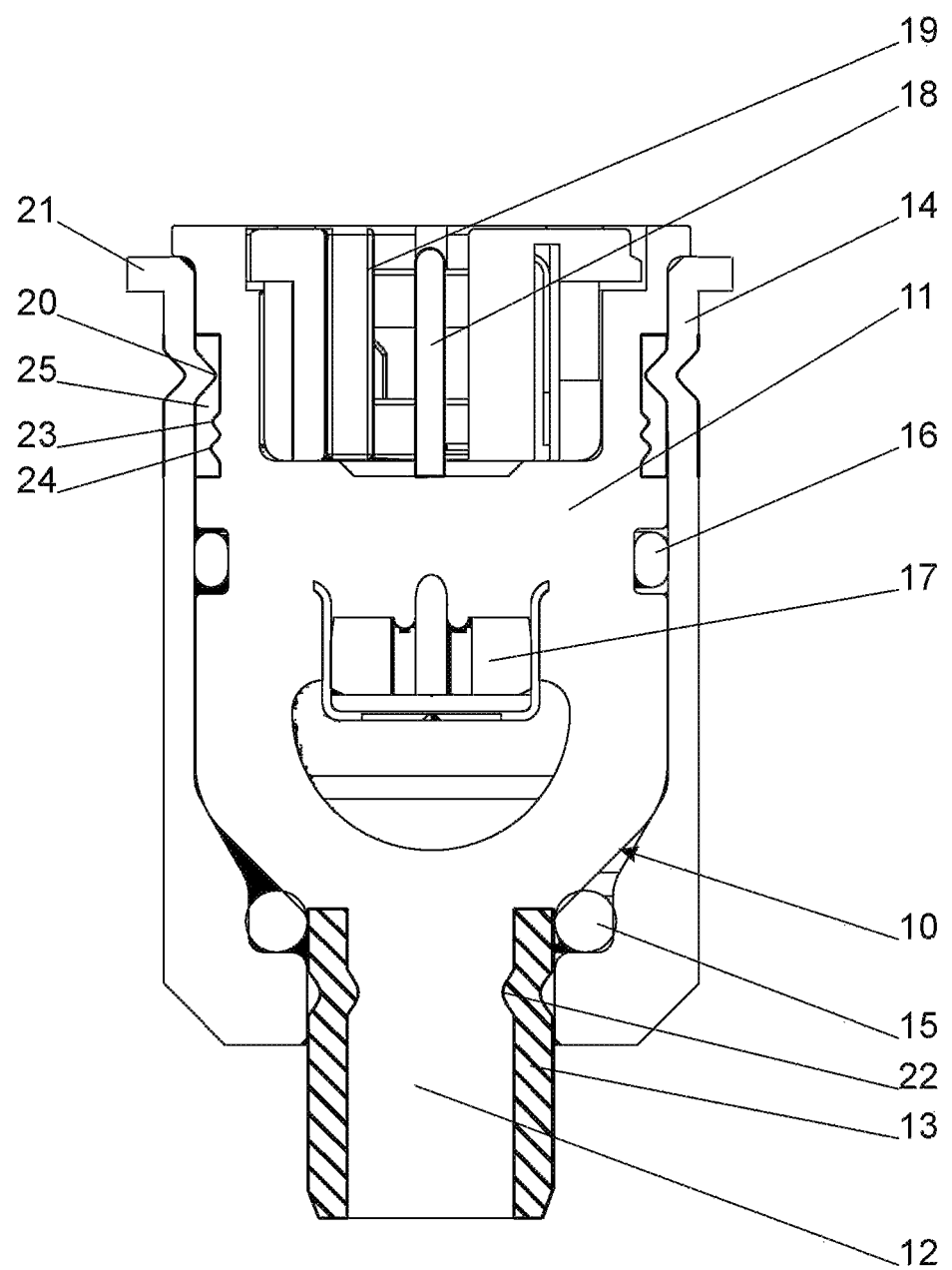

PYROTECHNIC ACTUATOR

CROSS REFERENCE TO RELATED APPLICATIONS

This application is the US-national stage of PCT application PCT/AT2021/060096 filed 24 Mar. 2021 and claiming the priority of Austrian patent application A50245/2020 itself filed 24 Mar. 2020.

TECHNICAL FIELD

The present invention relates to an actuator having a housing, a pyrotechnic charge and a piston that merges into a bolt that, in an initial state, projects out of the housing and, upon ignition of the pyrotechnic charge, is at least partially pulled back into the housing.

STATE OF THE ART

The FMVSS 208 provides high demands on the safety devices in a front crash. The load case of the 5% of unbelted females is not comparable to that of the 95% of belted 95% male, which is why many OEMs are set to adaptive systems that, depending on the occupant position and condition of the belt, generate other restraint values. This need is further enhanced by the trend for autonomous driving and the associated also possible occupant positions. The adaptability can be achieved either by varying the flexibility of the steering column or influencing the inflation behavior of the airbags. In both cases, mechanical connections must be released, for which pin pullers are well suited. A disadvantage is the higher price of the classic pin pullers in the 90° type shown for example in U.S. Pat. No. 4,412,420 or in US 2007/240417, for which reason more favorable solutions are sought.

In the Austrian utility model AT 11267 from which the claim preamble starts, such a cost-effective solution is shown in which both the housing and the piston are made of plastic. However, this solution does not meet the requirements with regard to radial forces generated when triggering an airbag.

DESCRIPTION OF THE INVENTION

It is an object of the present invention to provide an actuator of the type mentioned in the introduction, in which the production costs are only slightly higher than in the case of the solution according to AT 11267 and whose bolt can nevertheless absorb substantially higher radial forces.

This object is achieved according to the invention by an actuator of the type mentioned above in that the piston/bolt combination consists of a core made of plastic that has in the region of the bolt a reinforcing sleeve that has the shape of a sleeve or tube and surrounds the bolt, and that the reinforcing sleeve is connected to the bolt in a tight form fit.

Such a piston/bolt combination can be made relatively easily by a 2K injection-molding process, in that the reinforcing sleeve is inserted into an injection-molding tool and then the piston/bolt combination is injection-molded in the 2K injection-molding process. As with the solution according to AT 11267, it is thus possible to give the piston a complicated shape, in particular to accommodate the pyrotechnic charge in the piston, since the core is injection-molded; nevertheless, the bolt has a high bending stiffness as a result of the reinforcing sleeve that comes close to a metallic piston/bolt combination.

Since the reinforcing sleeve according to the invention has the shape of a sleeve or tube and surrounds the bolt, the radial strength is significantly increased with the same material expenditure for the reinforcing sleeve. For a connection that is as reliable as possible between the reinforcing sleeve and the core, according to the invention the reinforcing sleeve is connected to the bolt in a form fit. As a result, an unintentional separation of the reinforcing sleeve, which is conceivable in the case of a purely material-locking connection, is prevented with certainty.

The form fit connection can be achieved in that the reinforcing sleeve has at least one formation of reduced inner cross section.

The reinforcing sleeve may be made of metal.

Alternatively, the sleeve-shaped reinforcing sleeve can consist of plastic, in particular of PPS or partially aromatic polyamide. Such high-performance plastics have not only a high heat distortion resistance, so that they withstand an injection-molding process, but they also have sufficient strength if they are tubular in order to achieve the higher radial strength sought according to the invention.

If an O-ring is provided between the bolt and the housing, it is advantageous if the reinforcing sleeve extends from the free end of the bolt to past this O-ring. In this way, on the one hand, the entire relevant region is reinforced, and on the other hand, in the case of a sleeve-shaped reinforcing sleeve, the O-ring, when the bolt is retracted, always slides on the same material, so that good guidance is achieved.

The strength of the actuator can also be increased by the housing being made of metal.

In this case, the housing can have a constriction that projects into a circumferential groove of the piston and thus limits the travel path between the starting position and the end position of the piston. This constriction can easily be made in a metallic housing by plastic deformation after the piston has been inserted into the housing.

It is advantageous if structures for energy absorption, in particular shear elements, are provided in the recess. As a result, not only is the piston first fixed in the starting position, but it is also gently braked before the end of the circumferential recess strikes the constriction. If this collision is too great, there would be the risk that the housing is expanded and the piston/bolt combination is propelled out of the housing.

In order to prevent this, according to a further feature of the invention, the housing has a stiffening collar.

If the pyrotechnic charge is an igniter in the piston, the retainer socket for the plug can be formed in a cost-effective manner by the free end of the piston by injection molding in a simple manner.

BRIEF DESCRIPTION OF THE DRAWINGS

The present invention is explained in more detail with reference to the accompanying drawings, in which: The single FIGURE shows an actuator according to the invention in axial section.

BEST MODE FOR CARRYING OUT THE INVENTION

The actuator has a housing 14 in which a piston 11 can slide. This piston 11 merges into a bolt 12. The piston/bolt combination consists of a core 10 and a reinforcing sleeve 13 that surrounds the bolt 12.

So that there is a tight connection between the core 10 and the reinforcing sleeve 13, the reinforcing sleeve 13 has a formation 22 of reduced inner cross-section, in this case this is a circumferential groove. When the core 10 is made by injection molding with the reinforcing sleeve 13 already in the mold, the core 10 conforms to this groove, resulting in a complementary tight connection.

The piston/bolt combination is sealed with respect to the housing 14 by two O-rings 15, 16. One O-ring 16 is approximately in the center of the piston 11, and the other O-ring 15 is at the end of the bolt 12 closer to the piston 11. The reinforcing sleeve 13 extends from the free end of the bolt 12 to this O-ring 15, so that, when the bolt 12 is retracted, the O-ring 15 only slides on the reinforcing sleeve 13.

The piston 11 has a circumferential recess 25 in the form of an outwardly open groove into which a constriction 20 of the housing 14 extends. As a result, the axial travel between the starting position and the end position of the piston 11 is limited. Shear elements 23, 24 extend outward into this recess 25, so that the piston 11 is gently braked after triggering and thus the forces on the housing 14 are reduced when the end of the recess 25 facing the bolt 12 strikes the constriction 20. Due to this impact, considerable forces act on the housing 14 that attempt to expand it. In order to prevent such widening, the housing 14 has a collar rim 21 on its end opposite the bolt 12.

A pyrotechnic charge 17 in the form of an igniter is in the piston 11. It can be injection-molded in a simple manner in the manufacture of the core 10 by an injection molding, so that little additional manufacturing effort is made. The igniter has two connection pins 18 that are connected to the vehicle electrical system via an unillustrated plug. So that only the correct plug can be connected, a so-called retainer socket 19 with a special shape is provided that can be formed in the same injection-molding process, so that no additional manufacturing effort is made for the retainer socket 19.

The invention claimed is:

1. An actuator comprising:
    a housing,
    a pyrotechnic charge, and
    a piston that is formed unitarily with a bolt that, in the initial state, projects out of the housing and, upon ignition of the pyrotechnic charge, is at least partially retracted into the housing, the piston and bolt consisting of a core made of plastic surrounded by a tubular reinforcing sleeve on the bolt, the reinforcing sleeve being connected to the bolt in a complementary form-fit.

2. The actuator according to claim 1, wherein the sleeve-shaped or tubular reinforcing sleeve has at least one formation of reduced inner cross-section.

3. The actuator according to claim 1, wherein the reinforcing sleeve is of metal.

4. The actuator according to claim 1, wherein the reinforcing sleeve is of polyphenylene sulfide or a partially aromatic polyamide.

5. The actuator according to claim 1, further comprising:
    an O-ring between the bolt and the housing, the reinforcing sleeve extending from a free end of the bolt to this O-ring.

6. The actuator according to claim 1, wherein the housing is of metal.

7. The actuator according to claim 1, wherein the housing has a constriction that projects into a circumferential recess of the piston and thus limits a travel path of movement between a starting position and an end position of the piston.

8. The actuator according to claim 7, wherein structures for energy absorption, are provided in the recess.

9. The actuator according to claim 1, wherein the housing has a stiffening collar.

10. The actuator according to claim 1, wherein the pyrotechnic charge is an igniter in the piston and a retainer socket for the plug is formed by a free end of the piston.

11. A method of making the piston/bolt combination of the actuator according to claim 1, wherein the reinforcing sleeve is inserted into an injection molding tool and then the piston/bolt combination is injection-molded in a 2K injection-molding process into the reinforcing sleeve.

* * * * *